United States Patent Office 3,577,480
Patented May 4, 1971

3,577,480
GRAFT POLYMER OF A VINYL MONOMER AND A FIRE RETARDANT POLYESTER
Donald H. Thorpe, Williamsville, N.Y., assignor to Hooker Chemical Corporation, Niagara Falls, N.Y.
No Drawing. Continuation-in-part of application Ser. No. 544,816, Apr. 25, 1966. This application Nov. 12, 1968, Ser. No. 775,160
Int. Cl. C08f 21/00; C09k 3/28
U.S. Cl. 260—869          34 Claims

ABSTRACT OF THE DISCLOSURE

Graft copolymers are produced by reacting a polymerizable monomer with a polyester of a polycarboxylic compound and a polyhydric alcohol, wherein the polyester comprises a maximum of 5 mole percent of carboxylic and hydric components which contains aliphatic carbon-to-carbon unsaturation. Halogen-containing polyesters and phosphorus-containing polyesters are particularly useful in producing fire-retardant graft copolymers. The graft copolymers can be blended with a polymer of butadiene, such as a graft copolymer of a polymerizable monomer and polybutadiene to produce additional useful products. The polymer products are suitable for producing molded articles, laminates, extruded products, protective coatings, and the like, which have superior toughness, high-impact strength, fire resistance and chemical resistance.

REFERENCE TO PRIOR APPLICATION

This is a continuation-in-part of copending application Ser. No. 544,816, filed Apr. 25, 1966, now abandoned.

This invention relates to novel polymer compositions and to processes for producing them. More particularly, the invention relates to novel halogen-containing and phosphorus-containing thermoplastic polymers.

Industry is constantly in search of new and improved polymer compositions suitable for producing molded articles, laminates, extruded products, protective coatings, and the like. It is the objective of this invention to provide such polymer compositions that have many improved properties, such as superior toughness, higher impact strength, greater fire resistance and more chemical resistance.

This invention relates to copolymers of (1) a polymerizable compound containing aliphatic carbon-to-carbon unsaturation and (2) a polyester of a polycarboxylic compound and a polyhydric alcohol. The polyester generally contains a maximum of five mole percent of polycarboxylic compound or polyhydric alcohol or both, that contains polymerizable aliphatic carbon-to-carbon unsaturation. The invention further relates to blends or mixtures of such copolymers with a polymer of butadiene. Particularly desirable as polymers of butadiene for admixture with the copolymers of the invention are the graft copolymers of (3) a polymerizable compound containing aliphatic carbon-to-carbon unsaturation and (4) a butadiene polymer, particularly a polybutadiene. The invention further relates to processes for producing the foregoing polymer compositions.

The polyesters useful in the invention are generally the reaction products of a polycarboxylic compound and a polyhydric alcohol. By polycarboxylic compound is meant the polycarboxylic acids, polycarboxylic acid anhydrides, polycarboxylic acid halides, and polycarboxylic acid esters. The polyesters can be prepared from saturated carboylic and polyhydric compounds or can contain up to about five mole percent of polycarboxylic compound and/or polyhydric alcohol that contains aliphatic carbon-to-carbon unsaturation. The unsaturation can thus be provided in either or both the polycarboxylic compound or the polyhydric alcohol.

The saturated polycarboylic compounds useful in the preparation of the polyesters can be aliphatic, cycloaliphatic, aromatic or heterocyclic. Illustrative of these polycarboxylic acids, acid halides, acid anhydrides and acid esters are phthalic, isophthalic, terephthalic, tetrachlorophthalic, adipic, succinic, and mixtures thereof. Suitable saturated polyhydric alcohols for use in the preparation of the polyester resins include ethylene glycol, diethylene glycol, propylene glycol, dipropylene glycol, butane diol, pentane diol, hexane diol, glycerol, mannitol, sorbitol, bisphenols, such as 2,2-bis(4-hydroxyphenyl) propane and bis(4-hydroxyphenyl) methane; substituted bisphenols, such as bis(3 - chloro - 4 - hydroxyphenyl) methane, hydrogenated bisphenols and mixtures thereof.

Suitable unsaturated polycarboxylic acids having polymerizable aliphatic carbon-to-carbon double bonds, and the corresponding acid halides, esters, and anhydrides include maleic, chloromaleic, ethylmaleic, itaconic, citraconic, zeronic, pyrocinchoninic and acetylene dicarboxylic, either alone or in mixtures. Illustrative of the unsaturated polyhydric alcohols having polymerizable aliphatic carbon-to-carbon double bonds, which can be used in providing the unsaturation in the linear polyester molecules are compounds, such as butene diol, pentene diol, the unsaturated hydroxy ethers, such as allyl or vinyl glycerol ethers, allyl or vinyl pentaerythritol ethers and the like.

Fire-resistant copolymer compositions of the invention can be provided by employing polyester resins that contain either or both an adduct of hexahalocyclopentadiene and a polycarboxylic compound containing aliphatic carbon-to-carbon unsaturation and an adduct of hexahalocyclopentadiene and a polyhydric alcohol containing aliphatic carbon-to-carbon unsaturation. The halogen atoms of these adducts are selected from the group consisting of fluorine, chlorine and bromine and mixtures thereof. The preferred polyester resins of the invention are the reaction products of a polycarboxylic adduct of hexahalocyclopentadiene and a polyhydric alcohol. Such polyesters can also contain an unsaturated polycarboxylic compound and/or an unsaturated polyhydric alcohol, as well as additional saturated polycarboxylic compounds and polyhydric alcohols of the type disclosed hereinbefore. Also useful are the polyesters that are the reaction product of a polyhydric alcohol adduct of hexahalocyclopentadiene and a polycarboxylic compound. Such polyester resins can also contain an unsaturated polycarboxylic compound and/or an unsaturated polyhydric alcohol, as well as additional saturated polycarboxylic compounds and polyhydric alcohols of the type disclosed hereinbefore.

Among the adducts of hexahalocyclopentadiene and polycarboxylic compounds which may be used are:

1,4,5,6,7,7-hexachlorobicyclo-(2.2.1)-5-heptene-2,3-dicarboxylic acid;
1,4,5,6,7,7-hexachlorobicyclo-(2.2.1)-5-heptene-2,3-dicarboxylic anhydride;
1,4,5,6,7,7-hexachloro-2-methylbicyclo-(2.2.1)-5-heptene-2,3-dicarboxylic anhydride;
the mono- or dimethyl ester of 1,4,5,6,7,7-hexachlorobicyclo-(2.2.1)-5-heptene-2,3-dicarboxylic acid;
1,4,5,6-tetrachloro-7,7-difluorobicyclo-(2.2.1)-5-heptene-2,3-dicarboxylic acid;
1,4,5,6,7,7-hexachlorobicyclo-(2.2.1)-5-heptene-2-acetic-2-carboxylic anhydride;
1,4,5,6,7,7-hexachlorobicyclo-(2.2.1)-5-heptene-2,3-dicarbonyl chloride;
5,6,7,8,9,9-hexachloro-1,2,3,4,4a,5,8,8a - octahydro - 5,8- methano-2,3-naphthalene dicarboxylic acid and anhydride, and 1,2,3,4,5,6,7,7-octachloro-3,6-methano-1,2,3,6-tetrahydrophthalic acid and anhydride.

Among the adducts of hexahalocyclopentadiene and polyhydric alcohols which may be used are:

1,4,5,6,7,7-hexachloro-2,3-bis-hydroxymethylbicyclo-(2.2.1)-5-heptene;

1,4,5,6,7,7-hexachloro-2,3-bis-hydroxymethylbicyclo-(2.2.1)-2,5-heptadiene;

3-(1,4,5,6,7,7-hexachlorobicyclo-(2.2.1)-5-heptene-2-yl)-methoxy-1,2-propanediol;

1,4,5,6-tetrachloro-7,7-difluoro-2,3-bis-hydroxymethylbicyclo-(2.2.1)-5-heptene;

1,4,5,6,7,7-hexabromo-2,3-bis-hydroxy-methylbicyclo-(2.2.1)-5-heptene;

3 - (1,4,5,6-tetrachloro-7,7-difluorobicyclo-(2.2.1)-5-heptene-2-yl)-methoxy-1,2-propane diol. These compounds and methods of preparation are disclosed in U.S. Pat. No. 3,007,958, issued No. 7, 1961.

It is also within the scope of the invention to use other halogen-containing polyesters such as those derived from tetrachlorophthalic acid anhydride. The polycarboxylic compounds and polyhydric alcohols required in the production of the foregoing halogen-containing adducts and polyesters can be provided by using any of the compounds disclosed hereinbefore.

The temperature for the reaction between polyhydric alcohols and polybasic acids ranges from about 100 to 200 degrees centigrade, although higher or lower temperatures can be used. Esterification catalysts such as para-toluene sulfonic acid, benzene sulfonic acid, beta-naphthalene sulfonic acid and the like, or amines such as pyridine, triethyl amine, quinoline and the like can be added to the reaction mixture. The proportion of polyhydric alcohol is approximately controlled by the total mol proportion of acids in the esterification reaction mixture. It is also preferred to react the polyhydric alcohols and polybasic acids in roughly equimolar proportion, however, either the acids or alcohols can be used in substantial excess, if it is desired to form a low molecular weight polyester resin.

Phosphorus-containing polyester resins are also useful for preparing the copolymer compositions of the invention. Suitable phosphorus-containing polyester resins are the phosphonated polyester resins that result from the reaction of a trialkyl phosphite or a dialkyl phosphite with an unsaturated polyester resin. Among such products are the polymeric reaction products of components comprising a reactive phosphite of the formula

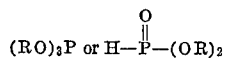

and an unsaturated polyester resin which contains aliphatic carbon-to-carbon double bonds that are conjugated with carbonyl groups, which products have phosphorus atoms attached directly to carbon atoms which were present in the resin prior to reaction with the phosphorus compound. More particularly, the polymer of a trialkyl phosphite comprises the polymeric reaction product of a reactive phosphorus compound of the formula $(RO)_3P$ and a unsaturated polyester resin which contains at least one carboxylic acid group per molecule that is conjugated with an aliphatic carbon-to-carbon double bond. The polymers of dialkyl phosphites preferably comprise a polymeric product of the reaction conducted in the presence of an alkaline catalyst, of components comprising a reactive phosphorus compound of the formula

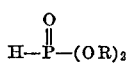

and an unsaturated polyester resin containing aliphatic carbon-to-carbon double bonds that are conjugated with carboxylic acid groups and which has an acid number of less than 30. In the foregoing formulas, each R is independently selected from the group consisting of alkyl, cycloalkyl, alkenyl, aryl, alkylaryl and arylalkyl, and halo-substituted or other substituted organic radicals of the foregoing group containing substituents which do not interfere in the reaction with the ethylenically unsaturated polyester. The preferred phosphorus compounds for preparing the phosphonated polyesters are the lower alkyl phosphites such as trimethyl phosphite and dimethyl phosphite and the lower alkenyl phosphites, such as triallyl phosphite and diallyl phosphite. Other specific phosphites that can be used are those where the R radicals are methyl, ethyl, isopropyl, butyl, hexyl, n-octyl, 2-ethylhexyl, decyl, hexadecyl, phenyl, benzyl, tolyl, cyclohexyl, allyl, crotonyl, beta-chloroethyl, beta bromoethyl, beta-methoxyethyl, beta-ethoxyethyl, beta-butoxyethyl, beta-phenoxyethyl, tetrahydrofurfuryl, tetrahydropyranyl, and mixtures thereof. Generally, it is preferred that no more than two aryl substituents be utilized. In general, the length of the carbon chains or number of carbon atoms in the aryl nuclei in the organic radicals of the phosphorus compound is not critical and may vary over wide ranges. The lower limit is the lowest possible number of carbon atoms such as one carbon atom in the alkyl groups and six carbon atoms in aryl groups and the upper limit is any practical number. However, a higher percent by weight of phosphorus can be incorporated into the polymer in instances where the organic radicals attached to the phosphorus atoms in the organic radicals R preferably contain from 1 to about 6 to 8 carbon atoms. In some instances, it may be desirable to provide halogen-containing groups for R to further enhance the fire resistance and thereby obtain a still further improved polymer.

The trialkyl phosphites readily react without the aid of a catalyst with unsaturated polyester resins of the type described hereinbefore, but which are further characterized by having at least one terminal carboxylic acid group per molecule that is conjugated with an aliphatic carbon-to-carbon double bond. Usually the resins are terminated with more than one and preferably more than two such carboxylic acid groups. More particularly, the unsaturated polyester resin reacted with the trialkyl phosphites are those having an acid number greater than 30, preferably greater than about 100. The acid number can vary up to about 500. Recently, it has been found the terminal carboxylic acid group is not required in the polyester, if there is provided in the reaction mixture a saturated monocarboxylic acid of 2 to 18 carbon atoms, such as acetic acid, propionic acid, benzoic acid, and the like. The unsaturated polyester resins can also contain one or more internal aliphatic carbon-to-carbon double bonds per molecule that are conjugated with carbonyl groups. Also, the unsaturated polyester resins can be terminated with one or more carbonyl groups, such as those provided by reaction with aldehydes and ketones.

It is preferred to carry out the reaction of the dialkyl phosphites with unsaturated polyester resins in the presence of an alkaline or anhydrous base catalyst. Examples of suitable catalysts include metallic sodium, potassium, and lithium; the alkali metal amides, such as sodamide; the alkali metal hydrides, such as sodium hydride and potassium hydride; alkali metal alcoholates (alkoxides), such as sodium methylate and potassium ethylate; sodium naphthalene; the secondary and tertiary amines, such as diethylamine and triethylamine; and the salts of phosphite diesters, such as sodium or potassium diethylphosphite. The amount of catalyst employed is not critical, provided that a catalytic amount of the catalyst is available during the reaction; usually about 0.5 to 5 weight percent of catalyst based on the weight of the reactants is a satisfactory amount. The unsaturated polyester resins that are preferred for reaction with the dialkyl phosphites are those resins that are substantially completely terminated in carboxylic acid ester groups. Such resins generally contain less than an average of one carboxylic acid group per molecule and thereby avoid consuming the alkaline catalyst used in the reaction. More particularly, these unsaturated polyester resins have an acid number of less than 30, preferably in the range of zero to about ten. These resins also contain at least one and preferably two or more carbon-to-carbon double bonds that are conjugated with a carbonyl group. They can also contain "internal" double bonds that are conjugated with a carbonyl group that does not occur at the end of a polymer chain. Generally, the unsaturated polyester resins used in the preparation of the phosphonated polyesters can contain various proportions of unsaturated components introduced through the acidic component, alcohol or alkenyl phosphite. However, the resulting phosphonated polyesters used in preparing the copolymers of this invention are characterized by having a maximum of five mole percent of polycarboxylic and polyhydric components that contain aliphatic carbon-to-carbon unsaturation.

The phosphonation temperature can vary over wide ranges, such as from about 20 degrees centigrade up to about 200 to 250 degrees centigrade or higher. Temperatures below about 130 degrees centigrade give better results in some instances. The reaction is carried out for a period of time sufficient to assure the addition of the phosphorus compound to the desired number of carbon-to-carbon double bonds, and reaction times and temperatures are not otherwise critical within the acceptable limits mentioned above. A solvent can be employed, if desired, and in instances where a solvent is employed it can be a material such as an ether, such as diethylether, aromatic hydrocarbons, such as benzene, and the like. The phosphorus compound is added to the unsaturated polymer in a proportion sufficient to impart the desired degree of flame resistance or other desirable properties to the final copolymer product of the invention. Generally, it is preferred that the unsaturated polyester be reacted with a sufficient proportion of phosphorus compound to provide from about 0.5 to about 10 weight percent of phosphorus in the phosphonated polymer. However, larger amounts of phosphorus can be added when desirable, such as 15 or 20 weight percent of the phosphonated polymer.

Other phosphorus-containing polyester resins known in the art can also be suitably employed in the preparation of the copolymer products of the invention. Also, it is within the scope of the invention to utilize various mixtures of halogen-containing polyesters and phosphorus-containing polyesters, as well as admixtures with polyester resins that contain neither halogen or phosphorus atoms.

The polymerizable compounds useful in preparing the copolymers of the invention by reaction with the foregoing polyester resins are generally those unsaturated monomers containing aliphatic carbon-to-carbon unsaturation, which are polymerizable or copolymerizable by free radical catalysts either alone or in admixture with other polymerizable compounds. Suitable unsaturated monomers generally have two to about eight carbon atoms per molecule. Typical polymerizable compounds include the vinyl aromatic compounds, such as styrene, vinyl toluene, alpha-methyl styrene, p-methyl styrene and other such alkyl styrenes, the chlorostyrenes, and the like; acrylonitrile, methacrylonitrile, ethacrylonitrile, methylene glutaronitrile, and the like; the acrylamides, such as acrylamide, N-n-butyl acrylamide, N-tert-butyl acrylamide, N,N-dimethyl acrylamide, N-phenyl acrylamide, α-chloroacrylamide, N-cyclohexyl acrylamide, methacrylamide, N-(1,1-dimethyl-3-oxobutyl)acrylamide, and the like; acrylic acid and its esters such as methyl acrylate, ethyl acrylate, butyl acrylate, 2-ethylbutyl acrylate, 2-ethylhexyl acrylate, octyl acrylate, methoxyethyl acrylate, butoxyethyl acrylate, and the like; methacrylic acid and its esters such as methyl methacrylate, butyl methacrylate, hexyl methacrylate, lauryl methacrylate, and the like; crotonic acid and its esters, such as ethyl crotonate, butyl crotonate, and the like; alpha, beta-unsaturated acids and esters, such as maleic anhydride, fumaric acid, dimethyl maleate, dibutyl maleate, diethyl fumarate, dihexyl fumarate, and the like; other unsaturated esters such as allyl acetate, allyl phthalate, allyl succinate, allyl adipate, allyl phosphate, allyl chlorendates, allyl tetrachlorophthalate, and other allyl esters; other vinyl compounds such as vinyl acetate, vinyl benzoate, vinyl ethers, vinyl chloride, vinylidene chloride, vinyl ketones, vinyl pyridine, and the like; halogenated olefins, such as tetrafluoroethylene, chlorotrifluoroethylene, perfluoropropene, and the like; the aliphatic diolefins, such as butadiene, isoprene, dimethylbutadiene, and the like; and other polymerizable or copolymerizable, unsaturated monomers. Especially useful are selected mixtures of the foregoing monomers. The foregoing polymerizable compounds are also useful in preparing graft copolymers with butadiene polymers for use in admixture with the polyester resins described hereinbefore.

In the preparation of the copolymers of the invention, at least one or more of the foregoing polymerizable compounds is reacted with the polyester resin in the ratio of about 20 to about 95 weight percent of polymerizable compound based on the total copolymerizable components. The proportion is preferably from about 50 to about 90 weight percent of polymerizable compound based on the total weight of the copolymerizable components. In a preferred aspect of the invention, styrene, methyl methacrylate, or mixtures thereof are used as the polymerizable compound with a polyester in the proportion of about 50 to about 90 weight percent of such polymerizable compound based on the total weight of polymerizable compound and the polyester. In another preferred aspect of the invention, a mixture of styrene with acrylonitrile, methacrylonitrile or mixtures thereof are used as the polymerizable compound in a proportion of about 50 to about 90 weight percent of polymerizable compound based on the total weight of the copolymerizable components, wherein from about 10 to 50 weight percent of the mixture of polymerizable compounds is acrylonitrile and/or methacrylonitrile. In still another preferred aspect, a mixture of α-methyl styrene with acrylonitrile, methacrylonitrile or mixtures thereof are used as the polymerizable compound in a proportion of about 50 to about 90 weight percent of polymerizable compound based on the total weight of the copolymerizable components, wherein from about 30 to 50 weight percent of the mixture of polymerizable compounds is acrylonitrile and/or methacrylonitrile. Mixtures of styrene and α-methyl styrene can also be employed in the foregoing aspects of the invention. The foregoing proportions also apply to the preparation of the copolymers of a butadiene polymer with a polymerizable compound in general, and with the foregoing specific polymerizable compounds, in particular.

The copolymerization of the polymerizable compounds with either the polyester, or in the case of a butadiene polymer for use in admixture with the halogenated polymers, can be carried out using a variety of techniques, e.g., suspension polymerization, emulsion polymerization or solution polymerization. In suspension polymerization, the preferred liquid medium is water. Also useful are aqueous salt solutions, for example, sodium chloride and other salt solutions, and aqueous alcoholic solutions, such as water-alcohol, water-glycol and water-glycerol solutions. A suspending agent or stabilizer is generally employed to prevent the pearls or particles of polymer from adhering together as the polymer passes through a sticky stage in the course of preparation. Suitable suspending agents or stabilizers include polyvinyl alcohol, gelatin, carboxymethyl cellulose, and tricalcium phosphate, talc, or other sparingly soluble salts. Other suspending agents are styrene-maleic anhydride, ethylene-maleic anhydride and vinyl methyl ether-maleic anhydride copolymers. Such agents or stabilizers are generally employed in small, but effective amounts, generally from about 0.1 to 5 weight percent of suspending agent based on the weight of the polymeric starting material. The suspension medium is generally employed in a weight ratio in the range of 10 parts of medium per part of polymer to about 1 part of medium per part of polymer starting material. In emulsion polymerization, the preferred liquid medium is water, but other media can be used, for example, aqueous alcoholic solutions, such as water-alcohol, water-glycol and water-glycerol solutions, especially for low temperature, activated polymerization systems. Emulsifying agents include sodium or potassium fatty acid soaps, rosin, disproportionated rosin or hydrogenated rosin soaps, salts of sulfonated alkyl benzenes, salts of sulfonated alcohols, phosphoric acid esters and salts and other anionic surface active agents. Non-ionic emulsifiers, such as oxyalkylated phenols, alcohols or polyethers can be used, as well as mixtures of non-ionic and anionic emulsifying agents. In solution polymerization, suitable solvent diluents include materials that are solvents for both the polymeric starting materials and end products and which are not deleterious to the reaction. Typical liquid media, i.e., are benzene, toluene, xylene, ethyl benzene, chlorobenzenes, dioxane, tetrahydrofuran, dimethylsulfoxide and dimethyl formamide.

The reaction of the polymerizable compounds with either the polyester or with a butadiene polymer, is preferably catalyzed with a free radical type catalyst, but can also be catalyzed by suitable ionizing radiation, such as β-rays, γ-rays, neutrons, accelerated electrons and heavy particles, X-rays, and the like. Ozone can also be employed as an initiator for this reaction. Generally, in suspension or solution polymerization techniques, water insoluble catalysts are employed, such as benzoyl peroxide, lauroyl peroxide, cumene peroxide, isopropyl peroxydicarbonate, dicumyl peroxide, t-butyl perbenzoate, di-t-butyl peroxide, phenyl cyclohexane hydroperoxide, diisopropyl benzene dihydroperoxide, methyl ethyl ketone peroxide, chlorobenzoyl peroxide, and the like. In emulsion polymerization processes, the water soluble catalysts are generally preferred, such as hydrogen peroxide, potassium persulfate, ammonium persulfate, cumene hydroperoxide, diisopropyl benzene dihydroperoxide. The catalyst is generally employed in the reaction mixture in a small but catalytic amount usually in the range from about 0.1 to 2 weight percent of catalyst based on the total weight of copolymerizable components in the reaction mixture. However, larger or smaller quantities of catalyst can be employed depending on other variables involved in the reaction and the desired characteristics of the end products. Chain terminators can also be employed in the reaction mixture to regulate or control the characteristics of the final products. Suitable chain terminators include the mercaptans, such as butyl mercaptan, dodecyl mercaptan, and the like; halocarbons such as carbon tetrachloride, trichloroethylene, perchloroethylene, and the like; cumene, cymene, diisopropyl benzene, and the like. Considerable latitude in the reaction temperature and time is permissible depending upon the other variables such as reaction catalysts that are employed, as well as depending upon the desired characteristics of the final product. Generally, the reaction temperature is in the range of 0 to 150 degrees centigrade, preferably in the range of 50 to 100 degrees centigrade. Reaction time can vary from 1 to 24 hours or greater. Atmospheric pressure is generally employed, although the reaction can also be conducted at super atmospheric pressure or under vacuum.

The foregoing reaction conditions also apply to the preparation of the graft copolymers of a butadiene polymer with polymerizable compounds, that are useful in admixture with the graft copolymers of the polymerizable compounds and the polyester resins.

The copolymers of a polymerizable compound with a polyester generally have an inherent viscosity in the range of 0.3 to 2 dl./g., more usually in the range of 0.5 to 1.2 when measured in solution of 60 volume percent toluene and 40 percent dimethylformamide. The molecular weights of the polymers of the invention are somewhat higher than that of the polyester resins alone, which are generally about 1000 or higher, more usually about 1500 to about 5000. The polyesters alone have at least two polycarboxylic compound-polyhydric alcohol units, preferably at least three such units or more per molecule. The solubility of the graft copolymers of the invention is somewhat dependent on what monomers are involved in their preparation. The graft copolymers are generally insoluble in compounds such as the aliphatic hydrocarbons, e.g., hexane and the like, and alcohols, e.g., methanol and the like.

Especially useful polymer compositions are provided by mixing the graft copolymers of a polymerizable compound and a polyester with a butadiene polymer. Particularly suited for use as the butadiene polymers are the graft copolymers of a polymerizable compound and a butadiene polymer, particularly a polybutadiene. As indicated hereinbefore, the graft copolymers of a polymerizable compound and a butadiene polymer can be produced in accordance with the conditions described hereinbefore and then physically blended or mixed with the graft copolymers of the invention. In a second embodiment, the graft copolymerization processes of the polymerizable compound with both the polyester and with the butadiene polymer can be carried out simultaneously. This embodiment has the advantages that individual preparation steps and a separate blending operation are avoided. Moreover, a more uniform product results. In a third embodiment, a polyester graft copolymer is blended with a butadiene polymer under conditions of high sheer, and optionally in the presence of free radical catalysts, whereby the composite polyester-polybutadiene graft copolymer of the invention is produced. In this process embodiment of the invention, the mixing of the polymers can be carried out, for example, on a rubber mill, in a Banbury mixer or in a mixing extruder. Again, a more uniform product results.

Polymers of butadiene that can be used in this invention are the various ethylenically unsaturated polybutadienes prepared by mass, solution or emulsion polymerization techniques, butadiene-styrene copolymers made by emulsion and solution methods, butadiene-styrene block copolymers, copolymers of butadiene with acrylonitrile, methacrylonitrile and terpolymers, such as styrene-acrylonitrile-butadiene terpolymers, and the like. Also useful are the polybutadienes which contain at least 30 percent of the cis-1,4 configuration, and preferably at least 80 percent of the cis-1,4 configuration, and still more preferably at least 90 percent of the cis-1,4 configuration. A process for producing a polybutadiene having such a high cis-1,4 content comprises reacting 1,3-butadiene in the presence of a catalyst composition comprising titanium tetraiodide and organo metal compounds such as dimethyl mercury, diethyl mercury, dibutyl mercury, dimethyl zinc, dibutyl zinc, and the like. The reaction is carried out at a temperature in the range of minus 80 to 150 degrees centigrade in the presence of a hydrocarbon diluent such as toluene. At the completion of the polymerization reaction, the catalyst is deactivated and the polymer is precipitated from the reaction mixture.

Generally, from about 10 to about 50 weight percent of the butadiene polymer is employed in the mixed polymer composition based on the total weight of the mixed polymer composition. The "mixed polymer composition" includes both the polyester and the butadiene polymer. However, larger proportions up to about 90 percent of the butadiene polymer can be employed based on the total weight of the mixed polymer composition. As will be apparent from the ensuing specific examples, the admixtures of the two copolymers have a superior combination of fire retardance, chemical resistance and mechanical properties, such as impact strength, tensile strength and flexural strength, compared to either copolymer used alone.

Various additives can be employed to advantage in combination with the graft copolymers of the invention, as well as the mixtures thereof with the graft copolymers of a butadiene polymer with a polymerizable compound. Particularly useful are stabilizers to protect the polymer compositions against degradation caused by various environmental factors. Suitable stabilizers can be classified into four groups. A more detailed description follows the ensuing brief description.

The first group of stabilizers are compositions comprising (A)(1) a polyvalent metal salt of a carboxylic acid and/or (2) a polyvalent metal salt of a phenol; and/or (B) an organic phosphite, particularly the trihydrocarbon phosphites.

The second group of stabilizers of this invention comprises compositions comprised of a substituted phenol having about 7 to about 30 carbon atoms, a polyvalent metal salt of an organic carboxylic acid having from about 6 to 18 carbon atoms and a polyol having the structure:

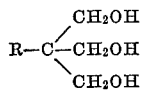

The third group of color stabilizers of this invention comprise an organo-tin compound having organic radicals linked to tin only through carbon or oxygen, at least two organic radicals being linked through carbon, and at least one organic radical being linked through oxygen to a carbonyl group of an unsaturated dicarboxylic acid ester of an alcohol having from one to two hydroxyl groups.

In addition to the foregoing classes of organo metallic compounds, useful stabilizers include dibasic lead phosphite and the lead carboxylates, and Group II metal sulfides such as zinc sulfide and barium sulfide.

GROUP ONE STABILIZERS

More particularly, the first group of organo metallic stabilizer compositions are comprised of a polyvalent metal phenolate, an organic phosphite and a polyvalent metal salt of a benzoic acid.

The polyvalent metal phenolates in this composition have the general formula $M(OR)_n$ wherein $n$ is the valence of the metal (M), M is selected from cadmium, zinc, lead, tin, barium, strontium, and calcium, and R is selected from alkyl substituted phenols and alkyl substituted phenols containing at least one substituent on the alkyl radical which has from 1 to 20 carbon atoms. The polyvalent radical phenolates of the substituted phenols listed below are illustrative of the phenolates that are employed in the stabilizers; butyl phenol, monochlorooctylphenol, nonylphenol, oleylphenol, laurylphenol, octadecylphenol and dibutylmethyl phenol, etc. The preferred phenolates are barium phenolates containing straight chain alkyl substituents having 6 to 13 carbon atoms; especially preferred are barium octyl phenolate and barium nonyl phenolate.

The organic phosphites utilized in the stabilizer composition of group one are selected from the class consisting of substituted or unsubstituted alkyl or phenyl phosphites, phosphites containing both alkyl and phenyl groups, organo halo phosphites and phosphorus halides containing one or two substituted or unsubstituted alkoxy and/or phenoxy groups bonded to the phosphorus atom. Each organo substituent group of the phosphite contains from 1 to 15 carbon atoms. The phosphite utilized should be substantially non-volatile at the conditions under which the resin is worked.

Polyvalent metal salts of the substituted or nonsubstituted benzoic acid employed in group one include the salts of cadmium, zinc, lead, tin, barium, strontium and calcium. The substituted benzoic acid may contain ring substitution which does not deleteriously affect the properties of the polymer and is not reactive with other components of the formulation, thereby affecting the polymer composition to be protected. Useful permissible substituting groups include fluorine, chlorine, and up to three alkyl (linear or branched) groups, for example, methyl, isopropyl, tertiary butyl, and so forth, the total number of carbon atoms in the substituting alkyl (linear or branched) group being not more than 12. The preferred metal salts are those of cadmium; and the preferred salts are cadmium benzoate and cadmium di(t-tert-butylbenzoate).

These stabilizer compositions contain between about 20 and about 80 percent, preferably about 20 to about 40 percent of the polyvalent salt of the benzoic acid, about 80 to about 20 percent and preferably about 60 to about 40 percent of the polymetallic phenolate and about 0.5 to about 50 percent and preferably about 8 to about 30 percent of the phosphite. The preferred stabilizer contains about 20 to 40 percent cadmium di(p-tert-butylbenzoate) or cadmium benzoate, about 45 to about 55 percent of barium octyl phenolate or nonylphenolate and the remainder triphenylphosphite, diphenylchloroethyl phosphite or diphenylchloropropyl phosphite.

Stabilizing compositions of group one are further exemplified in the art such as U.S. Pat. 2,935,491 issued May 3, 1960.

GROUP TWO STABILIZERS

The second group of color stabilizers of this invention are compositions comprised of a polyol, a polyvalent metal salt and a phenol. The polyols employed in the color stabilizer compositions of this group have the structure:

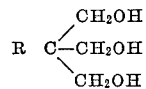

wherein R is hydrogen, alkyl, alkoxy, hydroxyalkyl, or alkoxy hydroxyalkyl. The R radical in general has from 1 to about 30 carbon atoms. The typical polyols of this formula include dipentaerythritol, trimethylolpropane, trimethylolmethane, trimethylolethane and trimethylolbutane.

The metal salt stabilizer is a salt of a polyvalent metal and a monocarboxylic organic acid having from 6 to 18 carbon atoms. The acid contains no nitrogen atoms in the molecule. As a class these acids can be aliphatic, aromatic, alicyclic or oxygen containing heterocyclic monocarboxylic acids. The acids may be substituted with groups, such as halogen, sulfur and hydroxyl. As exemplary of such acids are: caproic acid, capric acid, 2-ethyl hexoic acid, lauric acid, chlorocaproic acid, hydroxy capric, stearic acid, hydroxy stearic acid, oleic acid, myristic acid, dodecyl thioether propionic acid, monoethyl ester of phthalic acid, ethyl benzoic acid, isopropyl benzoic acid, p-tert-butyl benzoic acid, n-hexylbenzoic acid, salicylic acid, naphthoic acid, 1-naphthylene acetic acid, orthobenzoyl benzoic acid, methyl furoic acid, and the like. These are used in the form of their metal salts, particularly the alkaline earth metal salts, such as magnesium, barium, strontium, calcium, zinc, cadmium, lead, and tin salts. The barium, cadmium and zinc compounds are preferred. Suitable salts include barium laurate, cadmium laurate, cadmium benzoate, cadmium tert-butyl benzoate, cadmium stearate, zinc stearate and the like.

The third component of the composition of group two color stabilizers is a hydrocarbon substituted phenol having at least one phenolic hydroxyl group and from 1 to about 30 carbon atoms per phenolic hydroxyl group. The phenol contains one or more phenolic hydroxyl groups and may contain one or more phenolic nuclei. The phenol has one or a plurality of alkyl, aryl, or cycloalkyl substituents or a second ring condensed therewith such as a naphthol having one or more carbon atoms, up to the total number of carbon atoms per phenolic hydroxyl group. Usually, the phenols have up to about 18 carbon atoms in any alkyl, aryl, cycloalkyl, cycloalkenyl or alkylene group.

Exemplary phenols are ortho-, meta- and para-cresol, ortho-, meta- and para-phenyl phenol, xylenol, nonylphenol, dodecyl phenol, octyl phenol, octyl resorcinol, dodecyl resorcinol, octadecyl catechol, isooctyl phloroglucinol, 2,6-tritertiary butyl resorcinol, 2,2-bis (4-hydroxy phenol)propane, alpha and beta naphthol, mono- and di-tert-butyl substituted alpha and beta naphthols and the like.

The three components of the stabilizer of group two are utilized in the proportion of about 5 to 60 percent polyol, from about 5 to 60 percent hydrocarbon substituted phenol and from 90 to 35 percent metal salt.

GROUP THREE STABILIZERS

The preferred organo tin compounds utilized in the third group of stabilizers are of the formula:

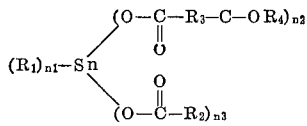

wherein $R_1$ and $R_2$ are hydrocarbon radicals having from about 1 to about 30 carbon atoms, which can contain inert substituents, such as halogen, ether and ester groups. $R_1$ can, for example, be an aliphatic group, such as alkyl and alkenyl, cycloaliphatic, such as cycloalkyl and cycloalkenyl, or a heterocyclic group. Included are radicals such as methyl, ethyl, isopropyl, butyl, vinyl, tertiary butyl, hexyl, oleyl, 2-ethylhexyl, lauryl, stearyl, allyl, furfuryl, cyclohexyl, cyclopentyl, tetrahydropyranyl and tetrahydrofurfuryl.

The

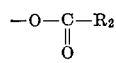

group can be derived from an organic carboxylic acid of the formula $R_2COOH$ including aliphatic, aromatic, cycloaliphatic and heterocyclic acid which can contain inert substituents, such as halogen, hydroxyl, ketone and alkoxy groups. Illustrative acids include acetic acid, propionic acid, oleic acid, ricinoleic acid, lineoleic acid, stearic acid, maleic acid, chloroacetic acid, hexanoic acid, octanoic acid, lactic acid, levulinic acid, 4-methoxy butyric acid, lauric acid, behenic acid, palmitic acid, benzoic acid, methylbenzoic acid and furoic acid.

$R_3$ is a hydrocarbon group containing from one to about 30 carbon atoms and containing an ethylenic double bond. The ethylenic double bond is alpha to a carboxyl group. The $R_3$ groups are derivable from alpha unsaturated dicarboxylic acid containing from about 4 to about 10 carbon atoms, such as maleic acid, fumaric acid, itaconic acid, glutaconic acid, citraconic acid, 2-hexene-1,4-dicarboxylic acid, 2-octene-1,8-dioic acid and 2,5-heptadienedioic acid.

The $R_4$ is an organic group derivable from a monohydric or a polyhydric alcohol. $R_4$ can be alkyl, alkenyl, alkylene, arylene, mixed alkyl-aryl, cycloaliphatic and heterocyclic and contain from about 1 to 30 carbon atoms and also contains ester groups, alkoxy groups, hydroxyl groups and other inert substituents. Preferably, $R_4$ is derived from a dihydric alcohol, such as glycol containing from 2 to about 30 carbon atoms including ethylene glycol, propylene glycol, diethylene glycol, dipropylene glycol, tetramethylene glycol, neopentyl glycol and decamethylene glycol or from monohydric alcohols containing from 1 to 30 carbon atoms, such as methyl, ethyl, propyl, n-butyl, t-butyl, isobutyl, octyl, decyl, and lauryl alcohols.

The sum of $n_1$, $n_2$ and $n_3$ is four, $n_1$ is either two or three and both $n_2$ and $n_3$ can range from zero to two.

Typical organo-tin compounds employable in this invention include dibutyltin-bis(dipropylene glycol maleate), di-n-octyltin-bis(dipropylene glycol monomaleate), tri-n-octyltin monoisooctyl maleate, dibutyltin diacetate, dibutyltin dilaurate, dibutyltin-bis (monoisooctyl fumarate), di(n-octyl)tin-di(monoisooctyl maleate), dibutyltin-bis(monoisooctyl maleate), ethyl n-butyltin-bis(octyl maleate), diisobutyltin-bis(propylene glycol monomaleate), diisopropyltin-bis(dipropylene glycol maleate), n-butyl undecyltin-bis(diethylene glycol monomaleate), di-n-butyltin-bis(ethoxyethyl maleate), isobutyl cyclohexyltin monophenylmaleate monoethoxy ethylmaleate, isooctyl undecyltin monoisooctyl maleate dipropylene glycol monomaleate and the like.

Additives that can be used to further enhance the fire resistance of the polymer compositions of the invention include antimony trioxide in the various forms in which it is commercially available, for example, deposited on silica, as well as various other inorganic antimony compounds such as antimony sulfide, sodium antimonite, potassium antimonite and the like. Organic antimony compounds are also suitable such as the antimony salts of organic acids and their pentavalent derivatives, for example, antimony butyrate, antimony valerate, antimony caproate, antimony caprylate, antimony anisate and their pentavalent dihalide derivatives. Likewise, the esters of antimonous acids and their pentavalent derivatives are useful such as tris(n-octyl) antimonite, tribenzyl antimonite, tris(beta-chloroethyl)antimonite, and their pentavalent dihalide derivatives. Still other suitable organic antimony compounds are the cyclic antimonites, such as trimethylol propane antimonite, and the like. The corresponding arsenic and bismuth compounds can also be employed. Other suitable additives include lubricants, such as stearic acid and other higher fatty acids, as well as calcium stearate and other higher fatty acid metal salts.

The polymer compositions of the invention can be used to produce moldings, by blow molding, injection molding and compression molding methods; extrusions, including extruded pipe; laminates, and coating compositions. The usual conditions employed in the art are useful in shaping the polymer compositions in the desired application. For example, the polymer compositions can be molded at temperatures in the range of 300 to 500 degrees Fahrenheit, preferably at 360 to 450 degrees Fahrenheit.

The invention is further described in the following specific examples which are intended to further illustrate the invention, but not to limit it. In these examples, the temperatures are in degrees centigrade, and the parts are by weight unless indicated otherwise.

PREPARATION OF POLYESTER RESINS

Example 1

65.1 parts of ethylene glycol were introduced to a reactor and heated to 110 degrees centigrade. Thereafter, 389 parts of chlorendic acid were added to the ethylene glycol slowly with agitation. The temperature of the reaction mixture was raised to 165-170 degrees centigrade and the water of esterification was removed with an inert gas stream that was passed through the reaction mixture. The reaction was terminated when the acid number had been lowered to a range of 15 to 20.

Examples 2 to 16

Additional polyesters were prepared in accordance with the procedure of Example 1, but in which different reactants and ratios of reactants were employed. The reactants and proportions and the acid numbers of the resulting polyester resins are tabulated in Table I.

Example 16a

An additional polyester was prepared in accordance with the procedure of Example 1, except that the reaction was terminated when the acid number reached about 55. The molecular weight of the polyester was determined by vapor pressure osmometer, with the following results.

In tetrahydrofuran _____ 952
In methylethylketone _____ 986

Other data are shown in Table I.

TABLE I

| Ex. No. | Acid | Moles of acid | Auxiliary acid | Moles of auxiliary acid | Glycol | Moles of glycol | Auxiliary glycol | Moles of auxiliary glycol | Acid No. polyester resin |
|---|---|---|---|---|---|---|---|---|---|
| 1 | CA | 1.0 | | | EG | 1.05 | | | 16.9 |
| 2 | CA | 1.0 | | | PG | 1.05 | | | 15.8 |
| 3 | CA | 1.0 | FA | 0.05 | DEG | 1.10 | | | 7.8 |
| 4 | CA | 1.0 | | | PG | 0.52 | DEG | 0.525 | 15.6 |
| 5 | CA | 1.0 | MA | 0.05 | EG | 1.05 | | | 17.8 |
| 6 | CA | 1.0 | | | PG | 1.02 | METP | 0.03 | 19.5 |
| 7 | CA | 1.0 | FA | 0.05 | EG | 1.05 | | | 13.3 |
| 8 | CA | 1.0 | FA | 0.10 | EG | 1.15 | | | 17.9 |
| 9 | CA | 1.0 | MA | 0.05 | NPG | 1.10 | | | 16.1 |
| 10 | CA | 1.0 | MA | 0.05 | PG | 1.10 | | | 17.6 |
| 11 | CA | 1.0 | THPA | 0.10 | PG | 1.15 | | | 14.9 |
| 12 | CA | 1.0 | | | EG | 0.99 | BG | 0.11 | 18.0 |
| 13 | TCPA | 1.0 | FA | 0.05 | EG | 1.10 | | | 27.3 |
| 14 | HCNA | 1.0 | | | EG | 1.1 | | | 20.2 |
| 15 | TBPA | 1.0 | | | EG | 1.1 | | | 25.0 |
| 16 | CA | 1.0 | MA | 0.03 | PG | 1.08 | | | 19.1 |
| 16a | CA | 1.0 | | | EG | 1.05 | | | 55 |

Note.—CA=chlorendic acid; TCPA=tetrachlorophthalic anhydride; TBPA=tetrabromophthalic anhydride; THPA=tetrahydrophthalic anhydride; HCNA=hexachlorooctahydro-5,8-methano-2,3-naphthalene dicarboxylic anhydride; FA=fumaric acid; MA=maleic anhydride; BG=1,4-butanediol; DEG=diethylene glycol; EG=ethylene glycol; METP=monoallylether of trimethylolpropane; NPG=neopentyl glycol; PG=propylene glycol.

Example 17

A phosphorus-containing polyester resin was prepared in the following manner. 98 parts by weight of maleic anhydride and 79.8 parts of propylene glycol were heated together at 200–210 degrees centigrade in a reactor provided with an inert gas sparge for purging the water of esterification. The reaction was continued until the acid number of the polyester was reduced to about 35. Then the polyester was cooled to about 110 degrees centigrade and 180 parts of acetic acid were added to the polyester. The acetic acid solution was reheated to 100 degrees centigrade and 124 parts of trimethyl phosphite were added slowly, while cooling the reaction mixture to remove the heat of reaction. The methyl acetate formed in the reaction was vaporized and continuously removed from the reaction mixture. After all the trimethyl phosphite was added, the temperature of the reaction mixture was gradually raised to 160 degrees centigrade and the reactor was maintained under vacuum to remove the methyl acetate and excess acetic acid. The resulting resinous polyester had a phosphorus content of 11 weight percent.

Similar polyester resins were prepared by the foregoing procedure, but the glycols employed were ethylene glycol, neopentyl glycol and the phosphites employed were triethyl phosphite, tributyl phosphite, tris(β-chloroethyl) phosphite and tris(chloropropyl) phosphite.

The following examples illustrate the preparation of polyester resins useful in the invention which contained neither halogen nor phosphorous.

Example 18

Adipic acid, ethylene glycol and propylene glycol were charged to a reaction vessel in a ratio to provide about 1.05 moles of glycol per mole of acid. The mixture was heated to about 200 degrees centigrade and maintained at this temperature until the acid number had been reduced to 0.3. The hydroxyl number of the polyester resin was 36.

Example 19

A reactor, equipped with a stirrer, condenser, thermometer and nitrogen gas inlet and outlet, was charged with 203 parts of terephthaloyl chloride (98% pure) and 20.8 parts of distilled neopentyl glycol. Using a slow flow of nitrogen gas and with stirring, the reactor was heated to a temperature of 70 to 74 degrees centigrade for 4.5 hours. The yield of hydrogen chloride gas after heating for 4.5 hours was 91 percent of the theoretical quantity. The flask was then charged with 2672 parts of distilled methylene choride and 9.28 parts of an aqueous benzyltrimethylammonium chloride solution containing sixty percent of the salt by weight. A dropping funnel containing a disodium bisphenol-A solution of 81.6 parts of sodium hydroxide, 182.6 parts of bisphenol-A and 1800 parts of water was placed on the reactor. The bisphenol-A solution was added to the reactor over a period of thirty minutes, with rapid stirring. The flow of dry nitrogen gas over the reactor contents was maintained at all times. The reaction temperature increased to reflux during the addition. The reaction mixture was then stirred for an additional 15 minutes at room temperature. The reaction mixture was mixed with 2680 parts of methylene chloride together with 2190 parts of a concentrated hydrochloric acid-distilled water solution (50:50 by volume) and the mixture was stirred for 5 minutes. After the stirring was stopped, a two phase solution resulted; the aqueous top layer was discarded and the methylene chloride polymer solution was washed with water until the aqueous wash layer gave a negative test to aqueous silver nitrate. The methylene chloride polymer solution was poured into an addition funnel and was slowly added to five gallons of acetone with rapid stirring. After drying, the precipitated polymer floc was found to possess an intrinsic viscosity of 1.89 dl./g. in s-tetrachloroethane at 30 degrees centigrade. The average melt viscosity was 299,300 poises at 325 degrees centigrade.

Example 20

A polyester resin containing both halogen and phosphorus was prepared in the following manner. 125.5 parts by weight of ethylene chlorophosphite and 150 parts by weight of methylene chloride were introduced to a reaction vessel. The resulting solution was heated to 50 degree centigrade, and thereafter 58 parts of acetone containing 0.13 part of water were added slowly to the reaction mixture. The temperature was maintained at 45–50 degrees centigrade for 16 hours. Then, methylene chloride was removed from the reaction mixture by distillation, the latter part of the distillation being conducted under vacuum at 120 degrees centigrade. The resulting phosphonate polyester contained 16.7 weight percent phosphorus and 19.4 weight percent chlorine.

COPOLYMERS OF POLYMERIZABLE COMPOUND AND POLYESTER

Example 21

20 parts by weight of the polyester resin prepared in Example 1 were dissolved in 64 parts of styrene and 16 parts of acrylonitrile. A solution of 0.1 parts of dioctylsulfosuccinate in 160 parts of water, and 20 parts of a one molar diammonium phosphate solution were added to the reaction mixture. The resulting suspension of the reactants was stabilized by the addition of 20 parts by weight of a 1.5 molar solution of calcium chloride. The polymerization was initiated with benzoyl peroxide and the suspension was heated for eight hours at 70 degrees centigrade. Thereafter, the reaction mixture was acidified with hydrochloric acid to a pH in the range of 4.0 to 4.5 dissolved the tricalcium phosphate suspending agent. The resulting polymer was filtered from the reaction mixture and was washed to free it of chloride ion. The graft copolymer product was dried in an oven at 70 degree centigrade for 16 hours.

100 parts by weight of the copolymer product were compounded with 3 parts of antimony trioxide and suitable stabilizers. The polymer compositions were rolled on a hot rubber mill and injection molded into test specimens measuring five inches by ½ inch by ⅛ inch. The molded products were found to have a flexural yield strength of 18,540 pounds per square inch, a flexural modulus of $5.32 \times 10^5$ pounds per square inch, and a heat distortion temperature of 72 degrees centigrade. Specimens were tested for flame retardance in accordance with ASTM D-635-56 and found to have a rating of "self-extinghishing" and a flame-out time of 7 seconds.

Examples 22 to 49

Additional graft copolymers were prepared using the procedure of Example 21, and employing various polyesters of Examples 1 to 20, as well as a variety of copolymerizable compounds in various proportions. The resulting copolymers were compounded, molded and tested as described in Example 21. The reactants, proportions of reactants and properties of the resulting molded products are tabulated in Table II. In Example 48, the inherent viscosity was measured in dimethyl formamide. In all the other examples, the inherent viscosity was measured in a solution of 60 volume percent toluene and 40 volume percent dimethyl formamide.

Example 50

20 parts by weight of the polyester resin of Example 16a were dissolved in 57.6 parts of styrene and 22.4 parts of acrylonitrile. A solution of 0.1 part of dioctylsulfosuccinate, 0.5 part of polyvinyl alcohol (88% hydrolzyed and having a viscosity of 35-45 centipoises in a 4% water solution) in 250 parts of water were added to the reaction mixture. 0.05 part of dodecylmercaptan was added. Polymerization was initiated with 0.4 part benzoyl peroxide and the suspension was heated for 16 hours at 70° C. The polymer product was filtered and dried at 70° C. for 16 hours. The product was then compounded and tested as in Example 21. The results are shown in Table II.

PREPARATION OF BUTADIENE POLYMERS

Examples 51 to 53

A polybutadiene latex was employed which had been prepared in a conventional manner by mixing about 100 parts by weight of butadiene, 57 parts by weight of water, 0.3 part by weight of potassium persulfate, 0.25 part by weight of dodecyl mercaptan and one part of sodium rosin acid soap, and heated the mixture to a temperature of about 110 degrees Fahrenheit. As the reaction proceeded, the temperature gradually increased and additional soap was added to the reaction mixture. After about 60 hours, the reaction was terminated, a maximum temperature being about 65 degrees centigrade. The resulting latex contained about 60 weight percent polybutadiene.

200 parts by weight of water, 66.7 parts by weight of the above-described polybutadiene latex, 1.4 parts of a sodium salt of disproportionated rosin, 43.2 parts of styrene, 16.8 parts of acrylonitrile, 0.3 part of dodecyl mercaptan and 0.4 part of potassium persulfate were charged into an agitated reactor and heated to 50 degrees centigrade. A stream of nitrogen was continuously passed through the reaction mixture. After 4 hours, an additional 0.4 part of potassium persulfate was added and the temperature was increased to 70 degrees centigrade for an additional 4 hours. At the end of the polymerization reaction, one part of dibutyl paracresol was added to the reaction mixture and the latex was coagulated by mixing it with a 2 weight percent calcium chloride solution at 95 degrees centigrade. The coagulated polymer was filtered from the suspension, washed free of chloride ion and dried in an air circulating oven at 70 degrees centigrade. A yield of 99.8 weight percent of graft copolymer was obtained. The copolymer had an inherent viscosity of 0.707 in a solution of 60 volume percent toluene and 40 volume percent dimethylformamide.

In a similar manner, other butadiene polymers were prepared being various ratios of polybutadiene, styrene and acrylonitrile. The proportions of reactants employed in Examples 51 to 53 are shown in Table III.

TABLE III

| Example No. | Parts by weight | | |
|---|---|---|---|
| | Polybutadiene | Styrene | Acrylonitrile |
| 51 | 40 | 43.2 | 16.8 |
| 52 | 40 | 40.8 | 19.2 |
| 53 | 30 | 45 | 25 |

TABLE II

| Example No. | Polyester of Ex. No. | Parts of polyester | Monomer | Parts of monomer | Comonomer | Parts of comonomer | Inherent viscosity, dl./g. | Flexural yield, p.s.i. | Flexural modulus ×10⁵ p.s.i. | Fire retardance ASTM D-635-56 | Flame out time, seconds | Heat distortion temp., °C. |
|---|---|---|---|---|---|---|---|---|---|---|---|---|
| 21 | 1 | 20 | S | 64 | AN | 16 | 1.0 | 18,540 | 5.32 | SE | 7 | 72 |
| 22 | 1 | 30 | S | 47.6 | AN | 22.4 | | | | | | |
| 23 | 1 | 40 | S | 40.8 | AN | 19.2 | | | | | | |
| 24 | 1 | 40 | S | 42.7 | MAN | 27.3 | 0.46 | | | SE | 5 | 82 |
| 25 | 1 | 30 | AMS | 28.0 | MMA | 42.0 | 0.13 | | | SE | 0 | |
| 26 | 2 | 20 | S | 64 | AN | 16 | 1.05 | 18,450 | 5.32 | SE | 10 | 72 |
| 27 | 2 | 30 | S | 54 | AN | 14 | 0.94 | 17,600 | 5.33 | SE | 0 | 70 |
| 28 | 3 | 40 | S | 42 | AN | 18 | 1.66 | | | | | |
| 29 | 4 | 20 | S | 64 | AN | 16 | 0.88 | 15,670 | 5.20 | SE | 5 | 79 |
| 30 | 5 | 20 | S | 80 | | | 1.11 | 15,480 | 5.06 | SE | 7 | 82 |
| 31 | 6 | 20 | S | 64 | AN | 16 | 0.84 | 16,550 | 5.30 | SE | 3 | 81 |
| 32 | 7 | 40 | S | 42 | AN | 18 | 1.53 | | | | | |
| 33 | 7 | 30 | MMA | 70 | | | 0.27 | 13,480 | 5.5 | SE | 26 | 80 |
| 34 | 8 | 30 | S | 47.6 | AN | 22.4 | 2.43 | 15,310 | 5.6 | SE | 0 | 80 |
| 35 | 8 | 30 | S | 50.9 | AN | 91.1 | 2.62 | | | SE | 0 | 77 |
| 36 | 9 | 40 | S | 43.2 | AN | 16.8 | 0.88 | | | | | |
| 37 | 10 | 40 | S | 43.2 | | 16.8 | 1.49 | | | | | |
| 38 | 11 | 20 | S | 64 | AN | 16 | 0.70 | 15,830 | 5.25 | SE | 4 | 79 |
| 39 | 12 | 20 | S | 64 | AN | 16 | 0.91 | 18,300 | 5.33 | SE | 8 | 78 |
| 40 | 15 | 20 | S | 64 | AN | 16 | 1.05 | 17,000 | 5.28 | SE | 4 | 79 |
| 41 | 16 | 30 | S | 50.4 | AN | 19.6 | 0.62 | | | | | |
| 42 | 16 | 40 | S | 44.2 | AN | 20.8 | 0.66 | | | | | |
| 43 | 16 | 20 | S | 57.6 | AN | 22.4 | 1.46 | 19,500 | 5.6 | SE | 7 | 82 |
| 44 | 16 | 30 | MMA | 70 | | | 0.53 | | | | | |
| 45 | 16 | 20 | S | 64 | AN | 16 | 1.68 | 19,180 | 5.55 | SE | 3 | 69 |
| 46 | 17 | 20 | S | 54.4 | AN | 25.6 | 1.11 | 16,100 | 4.9 | SE | 38 | 74 |
| 47 | 18 | 20 | S | 54.4 | AN | 25.6 | 1.22 | | | | | 46 |
| 48 | 19 | 20 | S | 54.4 | AN | 25.6 | 1.07 | | | | | 77 |
| 49 | 20 | 20 | S | 54.4 | AN | 25.6 | 1.22 | 15,900 | 5.1 | SE | 15 | 78 |
| 50 | 16a | 20 | S | 57.6 | AN | 22.4 | 1.23 | 17,430 | 5.0 | SE | 3 | 79 |

Note.—S=styrene; AMS=α-methyl styrene; MMA=methylmethacrylate; AN=acrylonitrile; MAN=methacrylonitrile; SE=self-extinguishing.

MIXED POLYMER COMPOSITIONS

Examples 61 to 68

In Examples 61 to 68, selected polyester copolymers of Examples 21 to 49 were dry blended with certain of the butadiene polymers of Examples 51 to 53. The polymers were employed in a ratio of one part of polyester copolymer to one part of butadiene polymer. Various stabilizers and lubricants were included in the blends. The blended polymers were extruded or mixed on hot rolls and molded specimens were prepared from the mixed polymer compositions. The specimens were employed to determine the physical properties and flame resistance of the various polymer compositions. Table IV tabulates the polyester copolymers and butadiene polymers employed in Examples 61 to 68 and enumerates the physical properties of the molded products. Flame retardance data are also provided in Table IV.

In Examples 61 to 68, the polymer compositions were dry blended with the following additives which are listed in weight proportions based on 100 parts by weight of polymer: 5 parts of antimony trioxide, 0.5 part of a liquid bisphenol-epichlorohydrin epoxy resin, 0.5 part of Phenolphite, 0.5 part of a polyethylene wax and 1 part of a stabilizer such as dibutyltin carboxylate.

after, 20.8 parts by weight of acrylonitrile, 0.5 part of benzoyl peroxide and 0.15 part of dodecyl mercaptan were added to the reaction mixture. The suspension was polymerized for eight hours at 70 degrees centigrade under a nitrogen atmosphere. At the end of the polymerization reaction, dibutyl paracresol was added to the reaction mixture as an antioxidant. Hydrochloric acid was added to the reaction mixture to reduced the pH to an range of 3.0 to 3.5 to dissolve the calcium phosphate. The resulting graft copolymer was filtered, washed and dried.

The resulting polymer composition was compounded with additives as described in Example 61. The resulting compositions were injection molded to provide test specimens measuring 5 inches by ½ inch by ⅛ inch. The physical properties and flame retardance of the molded specimens were determined. The properties are reported in Table V.

In Examples 72 and 79, additional polyesters and butadiene polymers were graft copolymerized with polymerizable compounds containing aliphatic carbon-to-carbon unsaturation using the procedure of Example 71. The resulting graft copolymers were compounded and tested as in Example 71 and the resulting properties are reported in Table V.

TABLE IV

| Ex. No. | Polyester of example No. | Butadiene polymer of example No. | Antimony oxide, parts | Flexural yield, p.s.i. | Flexural modulus $\times 10^5$, p.s.i. | Tensile yield, p.s.i. | Notched Izod impact, ft-lb./in. | Heat distortion temp., °C. | Fire retardence ASTM D-635-56 | Flame out time, seconds |
|---|---|---|---|---|---|---|---|---|---|---|
| 61 | 22 | 51 | 3 | 11,500 | 3.55 | 6,500 | 2.7 | 80 | SE | 9 |
| 62 | 22 | 52 | 4 | 12,310 | 3.8 | 6,910 | 1.4 | 82 | SE | 28 |
| 63 | 22 | 52 | 5 | 11,490 | 3.7 | 6,950 | 2.55 | 83 | SE | 6 |
| 64 | 23 | 52 | 3 | 11,240 | 3.7 | 6,090 | 2.1 | 80 | SE | 1 |
| 65 | 35 | 51 | 3 | 12,200 | 3.7 | 6,930 | 2.4 | 80 | SE | 10 |
| 66 | 28 | 52 | 3 | 12,530 | 3.8 | 6,570 | 1.4 | 82 | SE | 7 |
| 67 | 37 | 51 | 3 | 12,000 | 3.7 | 6,600 | 1.3 | 79 | SE | 0 |
| 68 | 32 | 52 | 3 | 11,500 | 3.9 | 6,520 | 1.6 | 80 | SE | 0 |

Example 69

80 parts by weight of the polyester graft copolymer of Example 35 were blended with 20 parts by weight of an emulsion polymerized butadiene-acrylonitrile copolymer comprised of about 35 weight percent acrylonitrile. Included in the blend were 3 parts of antimony trioxide, 1 part of zinc sulfide stabilizer, 0.5 part of polyethylene wax, 0.5 part of a liquid bisphenol-epichlorohydrin epoxy resin, 0.2 part of dibutyl peroxide, and 0.5 part of Phenolphite, i.e., the reaction product of triphenyl phosphite, pentaerythritol and bisphenol-A. The composition was milled on hot rolls for 10 minutes at 160 degrees centigrade and molded into specimens for determination of physical properties and fire retardance. The following results were obtained:

Flexural yield, p.s.i.—9280
Flexural modulus, p.s.i.—$3.14 \times 10^5$
Tensile yield, p.s.i.—4410
Notched Izod impact, ft.-lb./inch—1.6
Heat distoration temperature, ° C.—56
Fire retardance:
  ASTM D 635-56—Non-burning
  Flame-out time, seconds—0

Examples 71 to 79

In Examples 71 to 79, a combination of an emulsion and suspension techique was employed in the preparation of a mixed polymer composition. In Example 71, 15 parts by weight of the polyester of Example 1 were dissolved in 44.2 parts of styrene in a stirred reactor. Then, 160 parts of water containing 0.1 part of dioctylsodium sulfosuccinate, and 33.3 parts of a 60 percent solids polybutadiene latex prepared as in Example 51, were added to the reactants to form an emulsion. The emulsion was then converted to a suspension by the addition of 40 parts by volume of a 1.0 molar diammonium phosphte and ammonia soluition, followed by the addition of 40 parts by volume of a 1.5 molar calcium chloride solution. There-

Examples 80 and 81

In Example 80, 15 parts by weight of the polyester of Example 1 and 5 parts by weight of a solution polymerized styrene-butadiene copolymer containing 25.4 percent of combined styrene were dissolved in 57.6 parts by weight of styrene in a stirred reactor. To these reactants were added 120 parts by weight of water, 0.1 part of dioctylsodium sulfosuccinate, and 50 parts by volume of a 1.0 molar diammonium phosphate and ammonia solution. Tricalcium phosphate suspending agent was precipitated by the addition of 50 parts by volume of a 1.5 molar calcium chloride solution. Then, 22.4 parts by weight of acrylonitrile, 0.15 part of dodecylmercaptan, 0.35 part of benzoyl peroxide were added to the reactants. Polymerization was carried out for 8 hours at 70 degrees centigrade under a nitrogen atmosphere. At the completion of the polymerization, one part of dibutyl paracresol was added to the reaction mixture and the suspension was acidified with hydrochloric acid to reduce its pH to a value of less than 3.5. The graft copolymer product was filtered from the suspension, washed and dried.

In Example 81, another polymer composition was prepared using the procedure of Example 80, except that the addition of the acrylonitrile co-monomer was omitted, and the butadiene polymer was an emulsion polymerized styrene-butadiene copolymer. The proportions of the reactants are shown in Table V.

The copolymer products of Examples 80 and 81 were compounded and molded as described in Example 61. Test specimens were subjected to various physical tests, as well as fire retardance test ASTM D–635–56. The resulting properties are shown in Table V.

Examples 82 and 83

Polymer compositions were prepared using an emulsion technique as follows. In Example 82, 15 parts by weight of the polyester prepared in accordance with Example 1 were dissolved in 44.9 parts of α-methylstyrene and 20.1 parts of acrylonitrile. An emulsion of the reactants was prepared prepared by mixing the reactants with 200 parts by weight of water containing three parts of polyvinyl alcohol and 1.5 parts of dioctylsodium sulfosuccinate. To the emulsion were added 33.3 parts of a 60 weight percent solids polybutadiene latex prepared as described in Example 51. Then, 0.1 part of dodecylmercaptan was added to the reactants. The emulsion was heated to 50 degrees centigrade, whereupon 0.8 part of potassium persulfate was added to the emulsion and heating was continued for 4 hours at 50 degrees centigrade. Thereafter, the temperature was raised to 70 degrees centigrade and an additional 0.4 part of potassium persulfate was added to the emulsion. The temperature was maintained at 70 degrees centigrade for additional 4 hours. Then, 1 part of dibutyl paracresol was added to the emulsion, which was then mixed with a 2 percent solution of calcium chloride solution to coagulate the graft copolymer product at a temperature of 90 degrees centigrade. The coagulated product was filtered, washed and dried at 70 degrees centigrade.

In Example 83, another polymer composition was prepared using the procedure of Example 82 except that the auxiliary co-monomer was methacrylonitrile. The proportions of the reactants employed in this preparation are shown in Table V.

The products of Examples 82 and 83 were compounded, molded and tested as described in Example 61, and the resulting properties are shown in Table V.

Example 84

Another polymer composition was prepared using 20 parts of the polyester prepared in Example 16a, using the procedure of Example 71 except that 25 parts of polybutadiene latex, and 0.05 part of dodecyl mercaptan were employed, and the suspension was polymerized for 16 hours. The resulting graft copolymer has an inherent viscosity of 0.908. The copolymer was compounded and tested as described in Example 71 and the results are shown in Table V.

However, when other chlorine-containing compounds are employed, more chlorine is required. The use of some combinations of halogen and phosphorus compounds reduces the total requirement for fire retardant component in the compositions.

In the foregoing examples, the following test procedures were employed. ASTM refers to American Society for Testing Materials Heat distortion point — ASTM D648–56.
Impact strength — ASTM D256–56, Method A.
Flexural strength, flexural yield strength and flexural modulus. — ASTM D790–61, as modified by using ⅛ inch by ½ inch by 5 inch test bar.
Tensile strength and elongation. — ASTM D–638–61, as modified by using ⅛ inch by ½ inch by 5 inch test bar machined so that dimension C is 0.500 inch, dimension W is 0.1875 inch, and dimension F is 1.500 inches.
Flame retardance — ASTM D635–56.

While the invention has been described with reference to certain specific embodiments, it will be recognized by those skilled in the art that many variations are possible without departing from the spirit and scope of the invention.

I claim:

1. A graft copolymer of (1) a polymerizable monomer having aliphatic carbon-to-carbon unsaturation, and (2) a polyester of a polycarboxylic compound and a polyhydric alcohol, said polyester having a molecular weight of at least about 1000, having at least two polycarboxylic compound-polyhydric alcohol units and comprising a maximum of five mole percent of carboxylic and hydric component that contains polymerizable aliphatic carbon-to-carbon unsaturation, said polyester comprising a halogen-containing polyester, a phosphorus-containing poly-

TABLE V

| Ex. No. | Polyester of example No. | Parts of polyester | Parts of monomer Styrene | Parts of monomer Acrylonitrile | Parts of Butadiene polymer | Parts of antimony oxide | Flexural yield, p.s.i. | Flexural modulus × 10⁵, p.s.i. | Tensile yield, p.s.i. | Notched Izod impact, ft-lb./in. | Heat distortion temp., °C. | Fire retardance ASTM D–635–56 | Flame out time, seconds |
|---|---|---|---|---|---|---|---|---|---|---|---|---|---|
| 71 | 1 | 15 | 44.2 | 20.8 | 20 | 4 | 9,840 | 3.23 | 5,150 | 4.5 | 76 | SE | 6 |
| 72 | 1 | 15 | 46.8 | 18.2 | 20 | 5 | 8,580 | 2.98 | 4,390 | 3.9 | 75 | SE | 5 |
| 73 | 5 | 15 | 44.2 | 20.8 | 20 | 5 | 10,370 | 3.47 | 5,420 | 2.2 | 78 | SE | 3 |
| 74 | 6 | 15 | 44.2 | 20.8 | 20 | 5 | 9,790 | 3.32 | 5,020 | 3.4 | 79 | SE | 5 |
| 75 | 10 | 15 | 44.2 | 20.8 | 20 | 5 | 10,700 | 3.48 | 5,600 | 1.5 | 80 | SE | 7 |
| 76 | 14 | 15 | 44.2 | 20.8 | 20 | 5 | 9,850 | 3.50 | 5,100 | 1.4 | 79 | SE | 3 |
| 77 | 11 | 15 | 44.2 | 20.8 | 20 | 5 | 9,900 | 3.30 | 5,220 | 1.6 | 80 | SE | 2 |
| 78 | 3 | 15 | 44.2 | 20.8 | 20 | 5 | 10,000 | 3.35 | 5,020 | 1.5 | 77 | SE | 1 |
| 79 | 9 | 15 | 44.2 | 20.8 | 20 | 5 | 10,500 | 3.45 | 5,320 | 1.5 | 81 | SE | 1 |
| 80 | 1 | 15 | 57.6 | 22.4 | 5 | 5 | 14,550 | 5.0 |  | .360 | 76 | SE | 0 |
| 81 | 1 | 15 | 77 |  | 8 | 5 | 11,100 | 4.6 |  | .524 | 77 | SE | 0 |
| 82 | 1 | 15 | ¹44.9 | 20.1 | 20 | 5 | 10,390 | 3.56 | 4,920 | .370 | 86 | SE | 80 |
| 83 | 1 | 15 | ¹42.7 | ²27.3 | 20 | 5 | 8,470 | 2.97 | 4,600 | 3.00 | 83 | SE | 13 |
| 84 | 16a | 20 | 44.2 | 20.8 | 15 | 5 | 10,770 | 3.73 | 5,675 | 3.5 | 70 | SE | 8 |

¹ Methyl styrene; ² Methacrylonitrile.

It is apparent from the foregoing examples that the copolymers of a polymerizable material and the polyesters can be combined with butadiene polymers in several ways as exemplified by the physical blending processes of Examples 61 to 68, and the conjoint reaction processes of Examples 71 to 83. It is also within the scope of the invention to mold the polyester graft copolymer with the butadiene polymer, in the presence of a suitable initiator, such as a peroxide catalyst, to facilitate the grafting of the butadiene polymer to the polyester copolymer.

In the preparation of the fire retardant compositions of the invention, the halogen and/or phosphorus is present in a proportion sufficient to render said copolymer fire retardant. The actual proportion of halogen and/or phosphorus depends on the source of halogen or phosphorus since some compounds are more efficient in imparting fire retardance than others. Thus, when chlorendic acid is the source of halogen, at least about 5 weight percent chlorine based on the weight of polymer composition is sufficient.

ester or mixtures thereof, wherein said halogen and/or phosphorus is present in a proportion sufficient to render said copolymer fire retardant; wherein the polymerizable monomer is polymerized in the copolymer in a proportion from about 20 to about 95 weight percent based on the total copolymerizable components.

2. The copolymer of claim 1 wherein the said polyester contains halogen selected from the group consisting of fluorine, chlorine, bromine and mixtures thereof.

3. The copolymer of claim 2 wherein the halogen in the polyester is in the polycarboxylic compound.

4. The copolymer of claim 3 wherein said polycarboxylic compound is a tetrahalophthalic carboxylic compound.

5. The copolymer of claim 3 wherein said polycarboxylic compound is an adduct of hexahalocyclopentadiene and a polycarboxylic compound containing aliphatic carbon-to-carbon unsaturation.

6. The copolymer of claim 5 wherein said polycarboxylic compound is 1,4,5,6,7,7-hexachlorobicyclo-(2.2.1)-5-heptene-2,3-dicarboxylic acid.

7. The copolymer of claim 6 wherein the polyester contains substantially no unsaturated polycarboxylic and polyhydric components.

8. The copolymer of claim 6 wherein the polyester consists essentially of a reaction product of 1,4,5,6,7,7-hexachlorobicyclo-(2.2.1)-5-heptene-2,3-dicarboxylic acid, maleic anhydride and propylene glycol.

9. The copolymer of claim 6 wherein the polyester consists essentially of a reaction product of 1,4,5,6,7,7-hexachlorobicyclo-(2.2.1)-5-heptene-2,3-dicarboxylic acid, fumaric acid and ethylene glycol.

10. The copolymer of claim 7 wherein the polyester consists essentially of a reaction product of 1,4,5,6,7,7-hexachlorobicyclo-(2.2.1)-5-heptene-2,3-dicarboxylic acid and ethylene glycol.

11. The copolymer of claim 7 wherein the polyester consists essentially of a reaction product of 1,4,5,6,7,7-hexachlorobicyclo-(2.2.1)-5-heptene-2,3-dicarboxylic acid and propylene glycol.

12. The copolymer of claim 7 wherein the polyester consists essentially of a reaction product of 1,4,5,6,7,7-hexachlorobicyclo - (2.2.1)-5-heptene - 2,3 - dicarboxylic acid, propylene glycol and the monoallylether of trimethylolpropane.

13. The copolymer of claim 2 wherein the halogen in the polyester is in the polyhydric compound.

14. The copolymer of claim 13 wherein the polyhydric compound is an adduct of hexahalocyclopentadiene and a polyhydric compound containing aliphatic carbon-to-carbon unsaturation.

15. The copolymer of claim 14 wherein said polyhydric compound is 1,4,5,6,7,7-hexachloro-2,3-bis-hydroxymethylbicyclo-(2.2.1)-5-heptene.

16. The copolymer of claim 1 wherein the said polyester contains phosphorus.

17. The copolymer of claim 16 wherein the phosphorus-containing polyester is the reaction product of a reactive phosphite with an unsaturated polyester resin.

18. The copolymer of claim 1 having admixed therein an additive for the polymer.

19. The copolymer of claim 18 wherein the additive is a fire retardant additive.

20. The copolymer according to claim 1 wherein the polymerizable monomer is a mixture of monomers containing aliphatic carbon-to-carbon unsaturation and is reacted with the polyester in the ratio of about 20 to about 95 percent of polymerizable monomer based on the total copolymerizable components.

21. The copolymer according to claim 1 wherein the polymerizable monomer is a mixture of styrene and acrylonitrile, and the mixture is polymerized in the composition in a proportion from about 50 to about 90 weight percent based on the total copolymerizable components, and wherein the acrylonitrile comprises about 10 to 50 weight percent of said polymerizable monomer.

22. The copolymer according to claim 1 wherein the polymerizable monomer is methyl methacrylate, and the methyl methacrylate is polymerized in the composition in a proportion from about 50 to about 90 weight percent based on the total copolymerizable components.

23. The copolymer according to claim 1 wherein the polymerizable monomer is styrene, and the styrene is polymerized in the composition in a proportion from about 50 to about 90 weight percent based on the total copolymerizable components.

24. A polymer composition comprising a graft copolymer of (1) between about 50 and about 90 percent by weight of a mixture of styrene and acrylonitrile and (2) between about 10 and about 50 percent by weight of a polyester of a polyhydric alcohol and 1,4,5,6,7,7 - hexachlorobicyclo - (2.2.1) - 5 - heptene - 2,3 - dicarboxylic acid, said polyester comprising a maximum of 5 mole percent of polycarboxylic and polyhydric component that contains polymerizable aliphatic carbon-to-carbon unsaturation and having a molecular weight of about 1500 to about 5000.

25. The polymer composition of claim 1 having admixed therein a degradation stabilizer for the polymer.

26. The polymer composition of claim 25 wherein the stabilizer is an organo-tin compound having organic radical linked to tin only through carbon or oxygen, at least two organic radicals being linked through carbon, and at least one organic radical being linked through oxygen to a carbonyl group of an unsaturated dicarboxylic acid ester of an alcohol having from one to two hydroxyl groups.

27. The polymer composition of claim 26 wherein the organo-tin compound is dibutyltin carboxylate.

28. The polymer composition of claim 25 wherein the stabilizer is a Group II metal sulfide.

29. The polymer composition of claim 28 wherein the Group II metal sulfide is zinc sulfide.

30. A process for producing a graft copolymer which comprises reacting a polymerizable monomer having aliphatic carbon-to-carbon unsaturation with a polyester of a polycarboxylic and polyhydric alcohol, said polyester having a molecular weight of at least about 1000, having at least two polycarboxylic compound-polyhydric alcohol units and comprising a maximum of five mole percent of carboxylic and hydric component that contains polymerizable aliphatic carbon-to-carbon unsaturation, said polyester comprising a halogen-containing polyester, a phosphorus-containing polyester or mixtures thereof, wherein said halogen and/or phosphorus is present in a proportion sufficient to render said copolymer fire retardant; in the presence of a liquid medium for the reaction components, to produce a graft copolymer wherein the polymerizable monomer is polymerized in the copolymer in a proportion from about 20 to about 95 weight percent based on the total copolymerizable components.

31. The process of claim 30 wherein the liquid medium is water which contains an agent which prevents agglomeration of the reactants and polymer product.

32. The process of claim 30 wherein the liquid medium is water which contains an emulsifying agent for the reactants and polymer product.

33. The process of claim 30 wherein the liquid medium is a solvent for the reactants and polymer product.

34. The process according to claim 30 wherein the temperature is in the range of 0 to 150 degrees centigrade.

References Cited
UNITED STATES PATENTS

| | | | |
|---|---|---|---|
| 2,727,870 | 12/1955 | Beavers et al. | 260—22 |
| 3,247,146 | 4/1966 | Royston | 260—873 |
| 3,267,069 | 8/1966 | Cummings | 260—45.75 |
| 3,278,464 | 10/1966 | Boyer et al. | 260—75 |
| 3,294,711 | 12/1966 | Von Bonin | 260—873 |
| 3,306,866 | 2/1967 | Percival et al. | 260—29.6 |
| 3,316,192 | 4/1967 | Seibel | 260—23 |

MURRAY TILLMAN, Primary Examiner

J. C. BLEUTGE, Assistant Examiner

U.S. Cl. X.R.

260—862, 870, 873, 876, 75, 29.6, 29.7, 45.75, 45.85, 75.95, 835, 28.5, 159.19